(12) United States Patent
Kim et al.

(10) Patent No.: US 6,370,314 B2
(45) Date of Patent: *__Apr. 9, 2002__

(54) MAGNETIC RECORDING AND REPRODUCING APPARATUS FOR RECORDING A SIGNAL IN AN OPTIMAL RECORDING CONDITION

(75) Inventors: Chul-Min Kim, Anyang (KR); Masamitsu Seki, Tokyo (JP)

(73) Assignee: Samsung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,413

(22) Filed: Apr. 14, 1998

(30) Foreign Application Priority Data

Apr. 14, 1997 (KR) .............................. 97-13574

(51) Int. Cl.[7] .............................. H04N 5/91; H04N 7/00; G11B 27/36

(52) U.S. Cl. ............................. 386/46; 360/31

(58) Field of Search ................ 386/46, 21, 26, 386/113; 360/25, 31, 29, 30

(56) References Cited

U.S. PATENT DOCUMENTS

| | | | | | |
|---|---|---|---|---|---|
| 4,796,101 | A | * | 1/1989 | Kupfer | 386/93 |
| 5,416,641 | A | * | 5/1995 | Minakawa | 360/25 |
| 5,543,974 | A | * | 8/1996 | Sugita | 386/113 |
| 5,561,530 | A | * | 10/1996 | Kanazawa | 386/46 |
| 5,625,503 | A | * | 4/1997 | Sasajima | 360/25 |
| 5,740,309 | A | * | 4/1998 | Mimura | 386/93 |
| 6,101,312 | A | * | 8/2000 | Funayama | 386/93 |

* cited by examiner

*Primary Examiner*—Wendy R. Garber
*Assistant Examiner*—Po-lin Chieu
(74) *Attorney, Agent, or Firm*—Sughrue Mion, PLLC

(57) ABSTRACT

A magnetic recording and reproduction apparatus having a recording characteristic correction function corrects a recording characteristic according to characteristics of tape and head mechanism, to provide an optimal recording condition. The apparatus of the present invention records a test signal for measuring the characteristics of the tape and the head mechanism on tape, reproduces the recorded test signal, and then obtains a recording level at the time when reproduced output is maximized and a sideband level at the time when a ratio of a carrier component and a lower sideband component reaches a predetermined target value, respectively. Accordingly, an input video signal is modulated according to the obtained results. Thus, an effect is provided so that a signal can be recorded in an optimal recording condition irrespective of a deviation of the tape and the head.

11 Claims, 1 Drawing Sheet

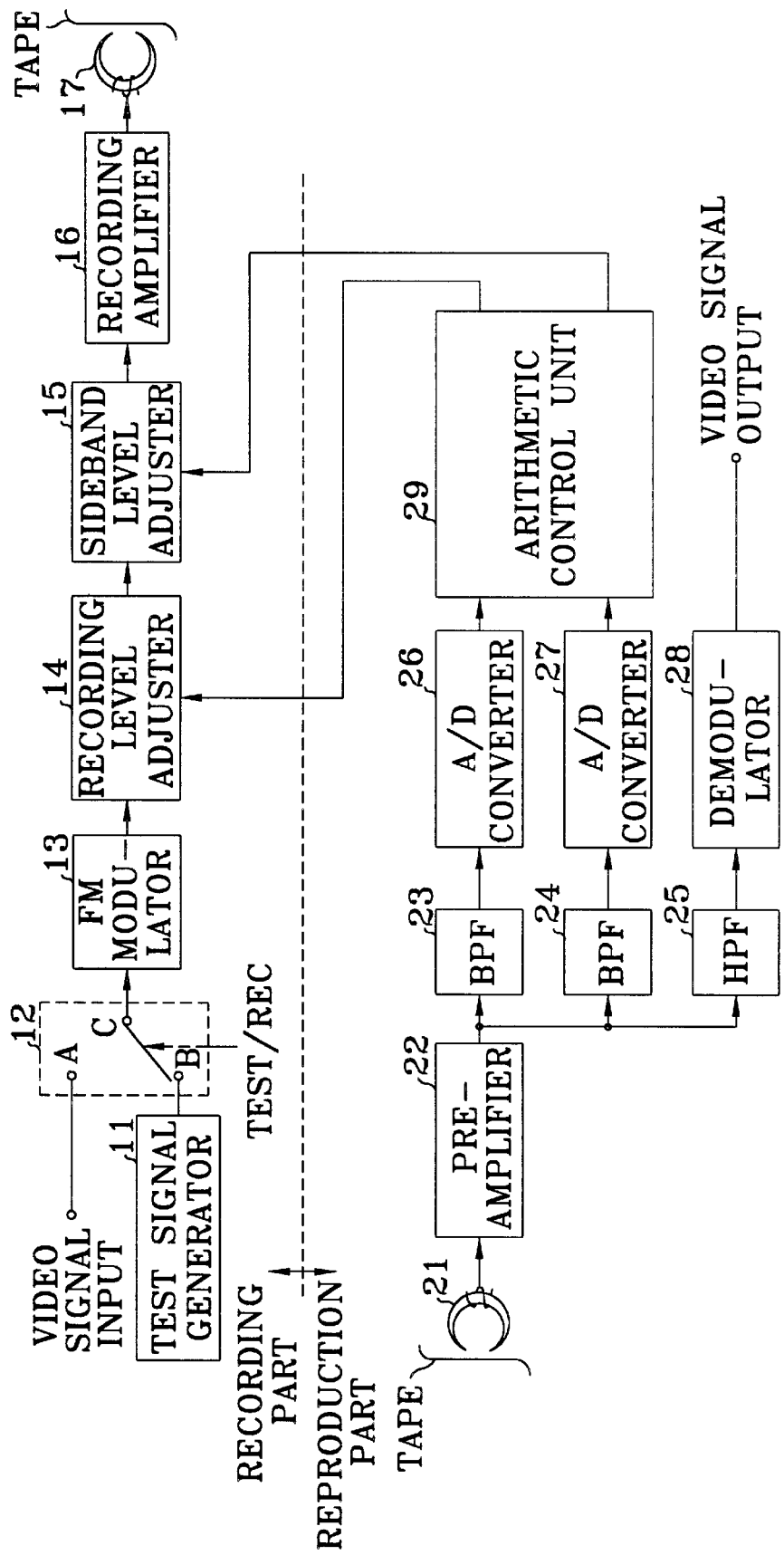

MAGNETIC RECORDING AND REPRODUCING APPARATUS FOR RECORDING A SIGNAL IN AN OPTIMAL RECORDING CONDITION

BACKGROUND OF THE INVENTION

The present invention relates to a magnetic recording and reproduction apparatus, and more particularly, to a magnetic recording and reproduction apparatus having a recording characteristic correction function, capable of recording a signal in an optimal recording condition by measuring characteristics of tape and head mechanism and adjusting a recording characteristic according to the measured characteristic.

It is usually difficult to record a video signal on tape directly in a magnetic recording and reproduction apparatus such as VCRs using magnetic tape as a recording medium. This is because a video signal has a frequency band of 30 Hz to 4.2 MHz. Thus, the video signal is modulated to alter a band of the video signal. Modulations methods include amplitude modulation (AM) and frequency modulation (FM). However, the FM method is chiefly used for recording a video signal on a recording medium.

Meanwhile, magnetic tape has a large characteristic deviation due to a difference of a magnetic force. According to the characteristic deviation, tape performance is determined. Tape is classified into standard (STD), high grade (HG), extra high grade (EHG), and a super VHS according to the performance. A head has a characteristic deviation equal to or more than approximately 30% according to its structure and magnetic material.

The magnetic characteristic of the magnetic tape also varies within the range which is specified under the standard of the magnetic recording and reproduction apparatus. Therefore, although a recording characteristic of the magnetic recording and reproduction apparatus is set based on tape having a standardized characteristic, it has been difficult to record a video signal fully reflecting the characteristic of the tape.

There have been various attempts to change a record characteristic based on the characteristics of a tape to be used. Among them, a method for obtaining an optimal recording current for every tape so that a reproduction level of a carrier is maximized is well-known. There is also a method for obtaining an optimal recording current at each frequency of a high-band, an intermediate-band, and a low-band.

SUMMARY OF THE INVENTION

To solve the above problems, it is an object of the present invention to provide a magnetic recording and reproduction apparatus having a recording characteristic correction function so that a signal can be recorded in an optimal recording condition, in which characteristics of tape and head mechanism to be used are measured and a record characteristic is corrected according to the measured characteristics.

To accomplish the above object of the present invention, there is provided a magnetic recording and reproduction apparatus using magnetic tape as a recording medium, the magnetic recording and reproduction apparatus comprising:

a test signal generator for generating a test signal to measure characteristics of tape and head mechanism; a recorder for modulating the test signal generated in the test signal generator and recording the modulated signal on the tape; a reproducer for reproducing the test signal which is modulated and recorded on the tape by the recorder; and an arithmetic control unit for estimating the characteristics of the tape and the head mechanism using the output from the reproducer, and correcting the recording characteristic of the recorder according to the estimated result.

BRIEF DESCRIPTION OF THE DRAWING

The preferred embodiment is described with reference to the drawing wherein:

FIGURE is a block diagram showing a magnetic recording and reproduction apparatus having a record characteristic correction function according to the present invention.

DETAILED DESCRIPTION OF THE PREFERRED EMBODIMENT

A preferred embodiment of the present invention will be described in detail with reference to the accompanying drawing.

Referring to the accompanying FIGURE showing a magnetic recording and reproduction apparatus of an FM signal recording mode, the apparatus according to the present invention largely includes a recording part and a reproduction part. The recording part includes a test signal generator 11 for generating a test signal for measuring characteristics of the tape and the head mechanism, and a switch 12 for selectively outputting the test signal generated in the test signal generator 11 and an input video signal to be recorded. The recording part also includes an FM modulator 13 for FM-modulating the output signal of the switch 12, a recording level adjuster 14 for setting a level according to the characteristics of the tape and the head mechanism and adjusting the FM signal output from the FM modulator 13 into a predetermined level, and a sideband level adjuster 15. Also, the FM signal output via the recording level adjuster 14 and the sideband level adjuster 15 is recorded on the tape via a recording amplifier 16 and a recording head 17.

Meanwhile, the reproduction part includes a preamplifier 22 for amplifying a signal read out from the tape via a reproduction head 21 into a predetermined magnitude, and two band pass filters (BPFs) 23 and 24 for extracting a carrier component and a lower first sideband component from the amplified signal, respectively. The reproduction part also includes a high pass filter (HPF) 25 for extracting a luminance signal from the amplified signal and two analog-to-digital (A/D) converters 26 and 27 for converting the carrier component and the lower first sideband component extracted from the BPFs 23 and 24 into a digital form, respectively. The reproduction part also includes a demodulator 28 for demodulating the luminance signal extracted from the HPF 25 into an original signal and outputting the demodulated signal, and an arithmetic control unit 29 for receiving digital data output from the A/D converters 26 and 27 and estimating characteristics of the tape and the head mechanism, in order to control the set level of the recording level adjuster 14 and the sideband level adjuster 15 of the recording part.

The operation of the present invention will be described below with reference to the FIGURE. Upon measuring the characteristics of the tape and the head mechanism, the magnetic recording and reproduction apparatus enters a pause/still (PAUSE/STILL) state in which the supply of tape is halted and tension is applied to the tape. A head is traced on the tape when the tape is in a constant condition of tension. When the measurement starts, the test signal generator 11 generates a test signal of DC voltage and applies the test signal to the FM modulator 13 via the switch 12.

Here, the switch 12 selects the test signal generated in the test signal generator 11 if the switching contactor "C" is contacted with a second contact "B" by a controller (not shown) when the magnetic recording and reproduction apparatus is in a test mode. The FM modulator 13 receives a test signal of a DC voltage and outputs a carrier frequency signal. Here, the recording level adjuster 14 and the sideband level adjuster 15 are in a default state which is set to a predetermined value considering characteristics of tape at the time of designing the tape, respectively. The carrier frequency signal output from the FM modulator 13 passes through the recording level adjuster 14 and the sideband level adjuster 15, in turn, and is applied to the recording head 17 via the recording amplifier 16. The recording head 17 records the applied carrier frequency signal on the tape for a single track.

The magnetic recording and reproduction apparatus traces the track on which the carrier frequency signal is recorded and reproduces the signal via the reproduction head 21, at the time when the recording head 17 completes recording. The preamplifier 22 amplifies a signal read out from the tape via the reproduction head 21 by a predetermined amplification factor and outputs the amplified signal to the BPFs 23 and 24. The first BPF 23 extracts a carrier component from the amplified signal, and the second BPF 24 extracts a lower first sideband component from the amplified signal. The A/D converters 26 and 27 respectively connected to the two BPFs 23 and 24 convert the extracted carrier component and the extracted lower first sideband component in a digital form and output the converted result to the arithmetic control unit 29, respectively. The arithmetic control unit 29 obtains an average of the digital data of the carrier component and the lower first sideband component, which are obtained by repeating the above processes a number of times. The arithmetic control unit 29 recognizes a reproduction output at the recording current from the obtained average, to estimate a tape characteristic.

If measurement of a default state is completed, the arithmetic control unit 29 gradually adjusts the recording level of the recording level adjuster 14, to perform identical measurement and obtain a recording level from which the maximum output is obtained. Also, the arithmetic control unit 29 fixes the recording level adjuster 14 to the recording level at that time when the maximum output is obtained.

Then, the test signal generator 11 generates a predetermined single sinusoidal signal. Here, the single sinusoidal signal is a frequency signal which causes a level distortion since the upper first sideband component of the recording FM signal is not sufficiently reproduced. For example, in case of a VHS system, the single sinusoidal signal becomes a frequency signal of 2 MHz. The single sinusoidal signal is applied to the FM modulator 13 via the switch 12. The FM modulator 13 receives the single sinusoidal signal to output the FM signal. The FM signal output from the FM modulator 13 passes through the recording level adjuster 14, and the sideband level is adjusted in the sideband level adjuster 15 and recorded on the tape.

The recording sequence is the same as in the recording level adjuster 14 and initially starts in the default state. If a test signal is recorded on one track, the recorded track is again reproduced by tracing the reproduction head 21. The carrier component and the lower first sideband component are extracted from the signal amplified in the preamplifier 22 via the BPFs 23 and 24. The extracted carrier component and lower first sideband component are converted in a digital form in the A/D converters 26 and 27, respectively, and are input to the arithmetic control unit 29. The arithmetic control unit 29 gradually adjusts the sideband level of the sideband level adjuster 15, so that a ratio of the carrier component and the lower sideband component becomes a predetermined target value, and performs recording and reproduction operations repeatedly, to then determine a set level of the sideband level adjuster 15.

As described above, after the recording level of the recording level adjuster 14 and the sideband level of the sideband level adjuster 15 have been adjusted in order to make an optimal recording condition, the magnetic recording and reproduction apparatus releases a still state and enters a normal recording mode (REC), to then receive a video signal via an input port. Here, the switch 12 selects a video signal input after the switching contactor "C" is contacted with the first contact "A" by a controller (not shown) and outputs the selected signal. The FM modulator 13 FM-modulates the video signal selected via the switch 12 and outputs the FM-modulated result. The recording level adjuster 14 adjusts the FM-modulated video signal according to a recording level set by the arithmetic control unit 29 and outputs the adjusted result. The sideband level adjuster 15 adjusts the FM signal whose recording level is adjusted according to a sideband level set by the arithmetic control unit 29 and outputs the adjusted result. The recording amplifier 16 amplifies the FM signal whose recording level and sideband level are adjusted into a predetermined magnitude, to thereby record the amplified result on the tape via the recording head 17.

Meanwhile, in the magnetic recording and reproduction apparatus of the normal reproduction mode, the preamplifier 22 amplifies the FM video signal read out from the tape via the reproduction head 21 into a predetermined amplification factor and outputs the amplified result to the HPF 25. The HPF 25 extracts the luminance signal from the amplified result, to output the extracted luminance signal to the demodulator 28. The demodulator 28 demodulates the extracted luminance signal into a signal of the prior-to-being-modulated condition, and outputs the demodulated result so as to be watched on a TV receiver.

As described above, the magnetic recording and reproduction apparatus having a recording characteristic correction function, measures characteristics of the tape and the head mechanism through recording and reproduction of a particular signal, adjusts the recoding level and the sideband level according to the measured characteristics in order to accomplish the optimal recording condition. Accordingly, the signal can be recorded in the optimal recording condition.

While only a certain embodiment of the invention has been specifically described herein, it will be apparent that numerous modifications may be made thereto without departing from the spirit and scope of the invention.

What is claimed is:

1. A magnetic recording and reproduction apparatus having a head mechanism and using magnetic tape as a recording medium, said magnetic recording and reproduction apparatus comprising:
   a test signal generator for generating a direct-current voltage as a test signal to measure characteristics of said magnetic tape and said head mechanism;
   a recorder arranged to modulate said test signal based on an FM signal recording mode for modulating said test signal and recording a modulated signal onto said magnetic tape, said recorder comprising:
   an FM modulator for receiving said test signal and outputting a carrier frequency signal; and a recording level adjuster for adjusting said carrier frequency signal output from said FM modulator into a recording level based upon one of a default adjustment level and an adjustment level determined by said arithmetic control unit; a reproducer for reproducing said test signal recorded on said magnetic tape by said recorder, said reproducer comprising:

a preamplifier for amplifying a signal read from said magnetic tape and outputting an amplified signal;

a plurality of band pass filters for extracting a carrier component and a lower first sideband component from said amplified signal, respectively; and a plurality of analog-to-digital converters for respectively converting said carrier component and said lower first sideband component into a digital carrier component and a digital lower first sideband component; and an arithmetic control unit for estimating the characteristics of said magnetic tape and said head mechanism from an output from said reproducer, and correcting a recording characteristic of said recorder according to estimated characteristics of said magnetic tape and said head mechanism.

2. The magnetic recording and reproduction apparatus according to claim 1, wherein said band pass filters are respectively connected to said analog-to-digital converters.

3. The magnetic recording and reproduction apparatus according to claim 1, wherein said arithmetic control unit calculates an average of digital data of said digital carrier component and said digital lower first sideband component, which are reproduced a plurality of times in said reproducer whenever said recording level of said recording level adjuster is changed, to estimate the characteristics of said magnetic tape and said head mechanism, and fixes said recording level adjuster to a recording level corresponding to a time when said amplified signal is maximized based on said estimated characteristics of said magnetic tape and said head mechanism.

4. A magnetic recording and reproduction apparatus having a head mechanism and using magnetic tape as a recording medium, said magnetic recording and reproduction apparatus comprising:

a test signal generator for generating a single sinusoidal signal as a test signal to measure characteristics of said magnetic tape and said head mechanism;

a recorder arranged to modulate said test signal based on an FM signal recording mode for modulating said test signal and recording a modulated signal onto said magnetic tape, said recorder comprising:

an FM modulator for receiving said single sinusoidal signal and outputting said FM signal; and a sideband level adjuster for adjusting said FM signal output from said FM modulator into an adjusted sideband level based upon one of a default sideband adjustment level and a sideband adjustment level determined by said arithmetic control unit;

a reproducer for reproducing said test signal recorded on said magnetic tape by said recorder, said reproducer comprising:

a preamplifier for amplifying a signal read from said magnetic tape and outputting an amplified signal;

a plurality of band pass filters for extracting a carrier component and a lower first sideband component from said amplified signal, respectively; and a plurality of analog-to-digital converters for respectively converting said carrier component and said lower first sideband component into a digital carrier component and a digital lower first sideband component; and an arithmetic control unit for estimating the characteristics of said magnetic tape and said head mechanism from an output from said reproducer, and correcting a recording characteristic of said recorder according to estimated characteristics of said magnetic tape and said head mechanism.

5. The magnetic recording and reproduction apparatus according to claim 4, wherein said band pass filters are respectively connected to said analog-to-digital converters.

6. The magnetic recording and reproduction apparatus according to claim 4, wherein said arithmetic control unit fixes said sideband level adjuster to a sideband level when a ratio of said digital carrier component and said digital lower first sideband component, which are reproduced from said reproducer whenever said sideband level of said sideband level adjuster is changed, reaches a preset target value.

7. A magnetic recording and reproduction apparatus having a head mechanism and using magnetic tape as a recording medium, said magnetic recording and reproducing apparatus comprising:

a test signal generator for generating one of a direct-current voltage signal and a single sinusoidal signal as a test signal to measure characteristics of said magnetic tape and said head mechanism;

a recorder arranged to modulate said test signal based on an FM signal recording mode for modulating said test signal and recording a modulated signal onto said magnetic tape, said recorder comprising:

an FM modulator for outputting a carrier signal when said test signal is input, and outputting said FM signal when said single sinusoidal signal is input;

a recording level adjuster for adjusting the carrier frequency signal output from said FM modulator into a recording level and outputting an adjusted signal, wherein said recording level is determined based upon one of a default adjustment level and an adjustment level determined by said arithmetic control unit, and adjusting said FM signal into a finally adjusted recording level and outputting a finally adjusted signal; and a sideband level adjuster for adjusting said carrier frequency signal to a default sideband adjustment level and outputting a sideband adjusted signal, and adjusting the FM signal based on one of the default sideband adjustment level and a sideband adjustment level determined by said arithmetic control unit;

a reproducer for reproducing said test signal recorded on said magnetic tape by said recorder, said reproducer comprising:

a preamplifier for amplifying a signal read from said magnetic tape and outputting an amplified signal;

a plurality of band pass filters (BPFs) for extracting a carrier component and a lower first sideband component from said amplified signal, respectively; and a plurality of analog-to-digital (A/D) converters for respectively converting an extracted carrier component and an extracted low first sideband component into a digital carrier component and a digital first sideband component; and an arithmetic control unit for estimating the characteristics of said magnetic tape and said head mechanism from an output from siad reproducer, and correcting a recording characteristic of said recorder according to estimated characteristics of said magnetic tape and said head mechanism.

8. The magnetic recording and reproduction apparatus according to claim 7, wherein said BPFs are respectively connected to said A/D converters.

9. The magnetic recording and reproduction apparatus according to claim 7, wherein said arithmetic control unit fixes said recording level of said recording level adjuster to a recording level having a maximum output from said reproducer, and then fixes said sideband level adjuster to a sideband level at a time when a ratio of said digital carrier component and said digital lower first sidebank component, which are reproduced from said reproducer, reaches a preset target value.

10. A magnetic recording and reproduction apparatus having a head mechanism and using magnetic tape as a recording medium, said magnetic recording and reproduction apparatus comprising:
- a test signal generator for generating a test signal to measure characteristics of said magnetic tape and said head mechanism;
- a recorder for modulating said test signal and recording a modulated signal onto said magnetic tape;
- a reproducer for reproducing said test signal recorded on said magnetic tape by said recorder; and
- an arithmetic control unit for estimating the characteristics of said magnetic tape and said head mechanism from an output from said reproducer based upon a ratio of selected components of said reproduced test signal, and correcting a recording characteristic of said recorder according to estimated characteristics of said magnetic tape and said head mechanism,
- wherein said selected components of said reproduced test signal include a carrier component and a lower first sideband component.

11. A magnetic recording and reproduction apparatus having a head mechanism and using magnetic tape as a recording medium, said magnetic recording and reproduction apparatus comprising:
- a test signal generator for generating a test signal to measure characteristics of said magnetic tape and said head mechanism;
- a recorder for modulating said test signal and recording a modulated signal onto said magnetic tape;
- a reproducer for reproducing said test signal recorded on said magnetic tape by said recorder, said reproducer comprising:
  - a preamplifier for amplifying a signal read from said magnetic tape and outputting an amplified signal;
  - a plurality of band pass filters for extracting a carrier component and a lower first sideband component from said amplified signal, respectively; and
  - a plurality of analog-to-digital converters for respectively converting said carrier component said lower first sideband component into a digital carrier component and a digital lower first sideband component; and
- an arithmetic control unit for estimating the characteristics said magnetic tape and said head mechanism from an output from said reproducer based upon a ratio of selected components of said reproduced test signal, and correcting a recording characteristics of said recorder according to estimated characteristics of said magnetic tape and said head mechanism.

* * * * *